United States Patent
Colliou et al.

(10) Patent No.: US 10,724,427 B2
(45) Date of Patent: Jul. 28, 2020

(54) METHOD FOR CONTROLLING THE QUANTITY OF AIR INTRODUCED TO THE INTAKE OF A SUPERCHARGED INTERNAL COMBUSTION ENGINE BY A SINGLE-INLET TURBOCOMPRESSOR

(71) Applicant: IFP Energies nouvelles, Rueil-Malmaison (FR)

(72) Inventors: Thierry Colliou, Les Cotes d'Arey (FR); Jean-Marc Zaccardi, Lyons (FR); Olivier Baudrand, Paris (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/099,867

(22) PCT Filed: Apr. 10, 2017

(86) PCT No.: PCT/EP2017/058530
§ 371 (c)(1),
(2) Date: Nov. 8, 2018

(87) PCT Pub. No.: WO2017/194252
PCT Pub. Date: Nov. 16, 2017

(65) Prior Publication Data
US 2019/0128174 A1    May 2, 2019

(30) Foreign Application Priority Data

May 11, 2016   (FR) ...................................... 16 54191

(51) Int. Cl.
*F02B 37/16*   (2006.01)
*F02D 41/10*   (2006.01)
(Continued)

(52) U.S. Cl.
CPC .......... *F02B 37/168* (2013.01); *F02B 37/025* (2013.01); *F02D 41/10* (2013.01);
(Continued)

(58) Field of Classification Search
CPC ...... F02B 37/168; F02B 37/025; F02D 41/10; F02D 41/0007; F02D 2250/34; Y02T 10/144
(Continued)

(56) References Cited

U.S. PATENT DOCUMENTS 4,404,805 A * 9/1983 Curtil ...................... F02B 37/10
123/41.41
4,559,784 A * 12/1985 Jenny ...................... F02B 33/44
60/606

(Continued)

FOREIGN PATENT DOCUMENTS

DE       10315148 A1    11/2004
EP        0038232 A2    10/1981
(Continued)

OTHER PUBLICATIONS

International Search Report for PCT/EP2017/058530, dated Jul. 4, 2017; English translation submitted herewith (7 pgs.).

*Primary Examiner* — Hoang M Nguyen
(74) *Attorney, Agent, or Firm* — Fitch, Even, Tabin & Flannery LLP (57) ABSTRACT

Control of a quantity of air introduced into an intake of a supercharged internal combustion engine which includes a proportional valve located in a partial transfer duct which controls flow of compressed air flow through the partial transfer duct into an inlet of a turbine. The proportional valve is controlled to move between open and closed positions in accordance with strategies in accordance with stabilized phases of operation of the engine. Characteristics
(Continued)

of stabilized phases of operation of the engine are determined and are used to control circulation of the compressed air during transitions between the stabilized phases of engine operation in accordance with the determined characteristics of the stabilized phases of the engine operation. The determined characteristics are derived from a previously completed mapping of speed and charging of the supercharged engine during a previous stabilized phase.

19 Claims, 6 Drawing Sheets

(51) Int. Cl.
  *F02B 37/02* (2006.01)
  *F02D 41/00* (2006.01)
(52) U.S. Cl.
  CPC ...... *F02D 41/0007* (2013.01); *F02D 2250/34* (2013.01); *Y02T 10/144* (2013.01)

(58) Field of Classification Search
  USPC .................................................. 60/602, 606
  See application file for complete search history.

(56) References Cited

U.S. PATENT DOCUMENTS

| | | | | |
|---|---|---|---|---|
| 5,873,248 | A | * | 2/1999 | Houtz ................... F02B 37/013 60/602 |
| 6,058,707 | A | * | 5/2000 | Bischoff ................. F02B 37/24 60/602 |
| 2017/0009676 | A1 | | 1/2017 | Sano et al. |
| 2018/0149075 | A1 | * | 5/2018 | Baudrand ............ F02B 37/025 |

FOREIGN PATENT DOCUMENTS

| | | | |
|---|---|---|---|
| FR | 2478736 | A1 | 9/1981 |
| FR | 2864994 | A1 | 7/2005 |
| FR | 2907848 | A1 | 5/2008 |
| GB | 1140877 | * | 1/1969 |
| WO | 2015/140989 | A1 | 9/2015 |

\* cited by examiner

METHOD FOR CONTROLLING THE QUANTITY OF AIR INTRODUCED TO THE INTAKE OF A SUPERCHARGED INTERNAL COMBUSTION ENGINE BY A SINGLE-INLET TURBOCOMPRESSOR

CROSS REFERENCE TO RELATED APPLICATIONS

Reference is made to PCT/EP2017/058530 filed Apr. 10, 2017, and French Application No. 16/54,191 filed May 11, 2016, which are incorporated herein by reference in their entirety.

BACKGROUND OF THE INVENTION

Field of the Invention

The present invention relates to a method for controlling a device for introducing the quantity of air into the intake of an internal combustion engine supercharged by a single-inlet turbocompressor, in particular a stationary engine or for a motor vehicle or industrial vehicle.

As is widely known, the power delivered by an internal combustion engine is dependent on the quantity of air introduced into the combustion chamber of the engine, which is itself proportional to the density of the air.

Description of the Prior Art

Thus, it is the usual practice to increase this quantity of air by use of compression of the outside air before it is taken into the combustion chamber. This operation, called supercharging, can be performed in many ways, such using a turbocompressor or a driven compressor, which can be centrifugal or volumetric.

In the case of supercharging by a single-inlet turbocompressor, it comprises a rotary turbine, provided with a single inlet, linked by a shaft to a rotary compressor. The exhaust gases from the engine pass through the turbine which is then driven in rotation. This rotation is then transmitted to the compressor which, through its rotation, compresses the outside air before it is introduced into the combustion chamber.

As is better described in the French patent application No. 2 478 736, there is provided, to be able to significantly boost this quantity of compressed air into the combustion chamber of the engine, to even further increase the compression of the outside air by the compressor.

That is done more particularly by increasing the rotational speed of the turbine and therefore of the compressor.

For that, a part of the compressed air outgoing from the compressor is deflected directly into the inlet of the turbine by being mixed with the exhaust gases. This turbine is then passed through by a greater quantity of fluid (mixture of compressed air and of exhaust gases), which makes it possible to increase the rotational speed of the turbine and consequently of the compressor. This increase in speed of the compressor thus makes it possible to increase the pressure of the outside air which is compressed in the compressor and then introduced in the combustion chamber of the engine.

The compressed air has a higher density which makes it possible to increase the quantity of air introduced and contained in the combustion chamber.

This type of supercharged engine, although satisfactory, does however exhibit substantial drawbacks.

Indeed, if the flow rate of the compressed air which is taken into the inlet of the turbine is not correctly controlled, a malfunctioning of the engine can occur.

Thus, by way of example, if too great a quantity of compressed air is deflected into the inlet of the turbine, the exhaust gases entering into the turbine are cooled too much by the compressed air, and as a result a reduction of the overall efficiency of the supercharging occurs.

SUMMARY OF THE INVENTION

The present invention provides a remedy to the above-mentioned drawbacks by virtue of being a method for controlling a device for introducing a quantity of air into the intake of a supercharged internal combustion engine which makes it possible to address all of the power demands of the engine, and in particular in transitional operating phases.

The present invention makes it possible to produce and manage a transfer of the compressed air from the intake to the exhaust even when the average pressure of the compressed air at the intake is lower than that of the gases at the exhaust. All that is required is for there to be phases during the operating cycle of the engine where the pressure at the intake is higher than that at the exhaust.

Thus, the present invention relates to a method for controlling the quantity of air introduced to the intake of a supercharged internal combustion engine, the engine comprising an exhaust gas outlet linked to an exhaust manifold, comprising a supercharging device comprising a turbocompressor with a turbine having a single inlet connected to the exhaust gas outlet and an outside air compressor, and a duct for the partial transfer of the compressed air from the compressor to the inlet of the turbine, wherein the partial transfer duct is linked to the inlet of the turbine, the duct having a proportional valve with the circulation of the compressed air being controlled in the duct during transition operating phases in accordance with the strategies applied to control of the valve which are determined according to the characteristics of the stabilized phases.

A non-return valve can also be disposed on the duct.

The compressed air circulating in the transfer duct can be heated.

For a control strategy, the following steps can be performed:
 beginning with an opening setting state of the valve for an initial stabilized state,
 the setting is reduced by a determined gradient, to a value that is maintained for a time t, and
 the setting is increased by a determined gradient to reach the opening setting of the valve for a final stabilized state.

The initial state can be a low charge state and the final stabilized state can be a high charge state.

The opening setting states of the valve for the initial and final stabilized states can be identical.

BRIEF DESCRIPTION OF THE DRAWINGS

The other features and advantages of the invention will emerge from reading the following description, which is given in a purely illustrative and nonlimiting manner, and to which are attached.

DETAILED DESCRIPTION OF THE INVENTION

Figure 1:
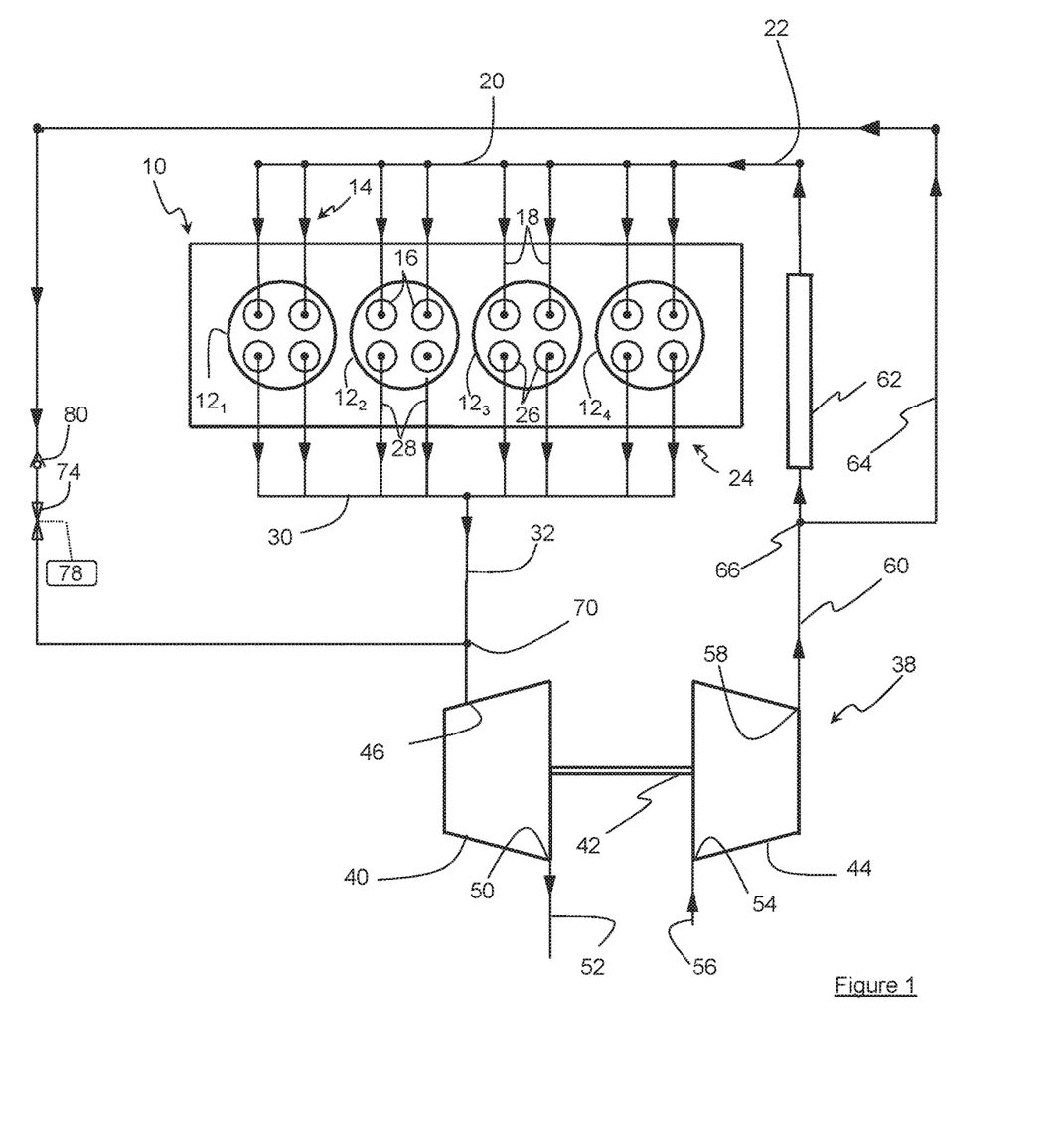
FIG. 1 illustrates an internal combustion engine having a supercharging device according to the invention.

In FIG. 1, the internal combustion engine 10 comprises at least two cylinders, and here four cylinders referenced 121 to 124 from the left of the figure are illustrated.

Preferentially, the engine is an internal combustion engine with direct injection, notably of diesel type, but this example does not in any way rule out any other type of internal combustion engine being used to practice the invention.

Each cylinder comprises an intake 14 having at least one intake valve 16, here shown with two intake valves each controlling an intake pipe 18. The intake pipes 18 flow into an intake manifold 20 fed by a duct 22 for supplying intake air, such as compressed air.

This cylinder also comprises a waste gas exhaust system 24 with at least one exhaust valve 26, which here are also illustrated as two valves each controlling an exhaust pipe 28.

In the example illustrated, the exhaust pipes of each cylinder are connected to flow into an exhaust manifold 30 with an exhaust gas outlet 32. This exhaust gas outlet flows to a turbocompressor 38 for the compression of the air and more particularly to an expansion turbine 40 of the turbocompressor.

As illustrated in FIG. 1, the turbocompressor is a single-inlet turbocompressor, better known by the term "Mono Scroll" or "Single Scroll" turbocompressor.

This type of turbocompressor comprises the expansion turbine 40 scavenged by the exhaust gases and which is linked by a shaft 42 to rotate a compressor 44.

At the turbine, the compressor 44 comprises a single inlet 46 for the exhaust gases which is connected to the exhaust gas outlet 32 of the manifold 30. The gas discharge 50 of the turbine 40 is conventionally connected to the exhaust line 52 of the engine.

The compressor 44 of the turbocompressor 38 comprises an outside air intake 54 fed by a supply duct 56. The compressed air outlet 58 of this compressor is linked to the supply duct 22 of the intake manifold 20 by a duct 60.

Advantageously, provision can be made to place a compressed air cooling radiator 62 on the duct 60, between the compressor and the duct 22.

As can be seen better in FIG. 1, a transfer duct 64 makes it possible to circulate a part of the compressed air outgoing from the compressor 44 to the inlet 46 of the turbine.

More specifically, this partial transfer duct starts from the duct 60, at a point of intersection 66 between the compressor and the supercharging air cooling radiator 62, and then flows to the inlet 46 of the turbine at junction 70 with the exhaust gas outlet 32.

This transfer duct supports the valve 74, which is a proportional valve, controlled by control 78. This type of proportional valve makes possible controlling the flow rate of the circulation of compressed air which circulates in the transfer duct 64.

Advantageously, the transfer duct also comprises a non-return valve 80 which prevents the circulation of the compressed air or of the exhaust gases from this duct to the compressor.

The use of this valve provides another advantage of the invention since it allows for operation of the bypass system even when the average pressure in the transfer duct 64 is lower than the average pressure in the exhaust outlet 32. It is in fact sufficient even for the pressure swings in each of these two branches to make possible an occasional pressure differential favorable to the bypass of the air from the intake to the exhaust for the bypass system to be active, and to be so even if the average pressure levels in these two branches oppose a flow from the intake to the exhaust.

This configuration thus makes it possible, during the operation of the engine, to exploit the zones of low exhaust pressure prevailing occasionally in the exhaust manifold to introduce compressed air into the turbine and thus increase the flow rate of this turbine and consequently of the compressor, more commonly called a "Boost Turbo". That also makes it possible to have a more effective supercharging for the low speeds and in particular to manage the transition phases with suitable proportional valve control strategies.

During operation, in a case when there is a need for large quantities of air in the cylinders, the proportional valve 74 is controlled to open to introduce compressed air from the compressor 44 into the turbine 40.

The compressed air outgoing from the compressor 44 circulates in the transfer duct 64 to leading to the exhaust gas inlet 46 of the turbine 40 and by adding a surplus of fluid to this turbine therein.

Thus, the turbine is passed through not only by the exhaust gases coming from the outlet 32, but also by compressed air which is added to these gases. Because of this, the rotation of the turbine is increased, which leads to an increase in rotation of the compressor and, consequently, an increase in the pressure of the compressed air which leaves this compressor.

The valve 74 is controlled by the control 78 to take a quantity of compressed air into the turbine according to the supercharging needs of the engine, and in particular during the transition phases lying between two stabilized operating phases.

Figure 2:
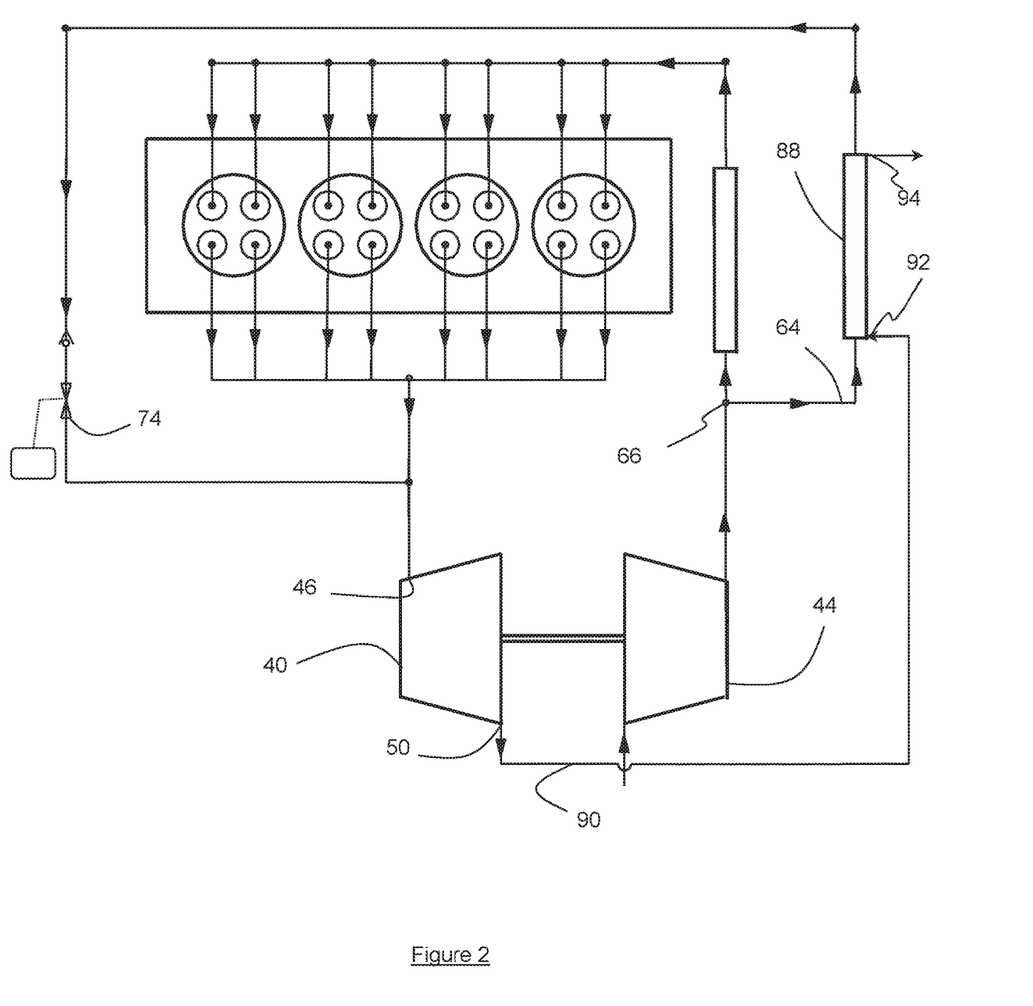
FIG. 2 illustrates a variant of the internal combustion engine having a supercharging device according to FIG. 1.

In FIG. 2, which essentially comprises the same elements as those of FIG. 1, the compressed air outgoing from the compressor 44 and circulating in the transfer duct 64 is preheated before being introduced into the turbine 40.

For this function, the transfer duct 64 supports 88 to heat the compressed air which, here is a heat exchanger configured as a heating radiator, placed after the intersection 66 and the valve 74. This radiator is crossed by the compressed air which circulates in this duct while being passed through by the exhaust gases from the engine. These exhaust gases originate from the discharge 50 of the turbine and are conveyed by a duct 90 to the inlet 92 of the radiator. The exhaust gases pass through this radiator, transferring the heat therein to the compressed air to then re-emerge from this radiator through the outlet 94 to be directed to the exhaust line of the engine.

Thus, a part of the energy of the exhaust gases is harvested by the compressed air which is introduced into the turbine by the inlet 46.

This heated compressed air thus makes it possible to provide additional energy to the turbine which, consequently, will turn at a higher speed. This high rotational speed is then transmitted to the compressor which will produce a higher compression of the outside air.

The operation of the system described above, whether associated or not with an exhaust gas recirculation (EGR) circuit at the intake, needs to be adjusted precisely in order to produce the desired short-circuiting rate.

Generally, the operation of the engine can be considered a succession of stabilized phases (which can be more or less long) broken up by more or less abrupt transition phases.

The initial pre-positioning of the valve 74 is an opening setting derived from a previously completed speed/charge mapping. Furthermore, the compressed air flow rate at the inlet of the turbine is estimated by virtue of previously defined measurements and/or estimators.

The present invention is particularly suited for managing the transition operating phases between two stabilized operating phases.

"Stabilized operation" should be understood to mean a state in which either the torque demand does not vary, or the set of actuators of the engine are not modified, for example when the quantities of fuel injected are constant over time, the EGR rate remains constant, the actuator of the turbocompressor is in one and the same position, etc.

Conversely, "transitional operation" should be understood to mean the phase during which certain actuators are activated in response to a change of the power demand from the user. It is for example possible to describe the case of a "charge-up" during which the user will ask the engine to switch from a low-charged state (little torque, little power) to a high-charged state (high torque, high power). This charge-up can be carried out either at constant engine speed, or with a simultaneous increase in the charge and the speed. It is also possible to consider the example of a "foot lift", that is to say a more or less abrupt reduction of the torque demand. In each of these cases, the actuators of the engine must be driven in order to ensure an optimal operation of the power train (GMP).

Thus, during the stabilized operating phases, two types of operation can be envisaged:
  Either the position of the valve 74 corresponding to the flow rate of the initially completed mapping remains in this position as long as the charge/speed demand is unchanged.
  Or the position of the valve 74 is adjusted throughout the period during which the engine remains in this stabilized phase. In this case, it has to be adjusted to obtain the best trade-off between:
    the temperature at the exhaust (heating or cooling demand)
    the richness of the exhaust (regeneration of the particulate filter FAP which makes it possible to control the oxygen ratio at the exhaust)
    the consumption
    the pollutant emissions
    the dynamics requirement
    the performance levels The rate of compressed air diverted is therefore adjusted throughout the stabilized operating phase in order to obtain the best operating point that satisfies the desired trade-off. The search for this trade-off is therefore done based on the analysis of all or some of the following measurements or estimators:
  the speed
  the charge
  the temperature at the cylinder head outlet or turbine outlet exhaust: in the case where a maximum temperature criterion is provided
  the dynamic history (analysis of use): in the context of a highly dynamic use in which the invocations of torques are frequent or very frequent, the position of the valve 74 can be positioned to prioritize the engine response possibly momentarily to the detriment of other parameters.
  the regeneration of the particulate filter (FAP): in the context of an FAP regeneration, the opening of the valve 74 can be prevented, even limited, in order to control the air flow rate on the FAP and not risk the runaway of the regeneration that can lead to an excessively high temperature.
  the post-treatment temperature: in the case where the compressed air intake at the inlet of the turbine may lead to the unpriming of the post-treatment, the use thereof can be limited. However, in the case where the dynamic history shows a significant probability of the stabilized phase being followed by an increase in charge, the criterion of dynamic range may be favored.
  engine temperature (water temperature/oil temperature)
  the temperature of the air
  the stabilization time: based on the time of operation of the stabilized point, the strategy of compressed air intake at the inlet of the turbine can be reviewed. For example, the dynamic history may show a highly "dynamic" operation that the time of stabilization on the point may contradict The valve is therefore positioned to obtain the target flow rate of diverted compressed air, corrected or not by virtue of the estimators.

In addition, provision is made to optimize the dynamic range of the engine during transitional operation by controlling the opening and the closing of the valve 74 allowing the passage of the gases from the partial transfer duct for compressed air to the inlet 46 of the turbine 40.

Generally, these transitional phases can be defined as being transitional phases between two stabilized states for which the scavenging level, permitted by the proportional valve 74, is stabilized and optimal from the point of view of the engine performance levels expected on each of these operating points. The optimal control of the valve of the partial transfer duct applies a determined strategy for changing the trajectory of closure or opening of the valve in order to switch from one stabilized state to another stabilized state in optimized conditions.

Figure 3:
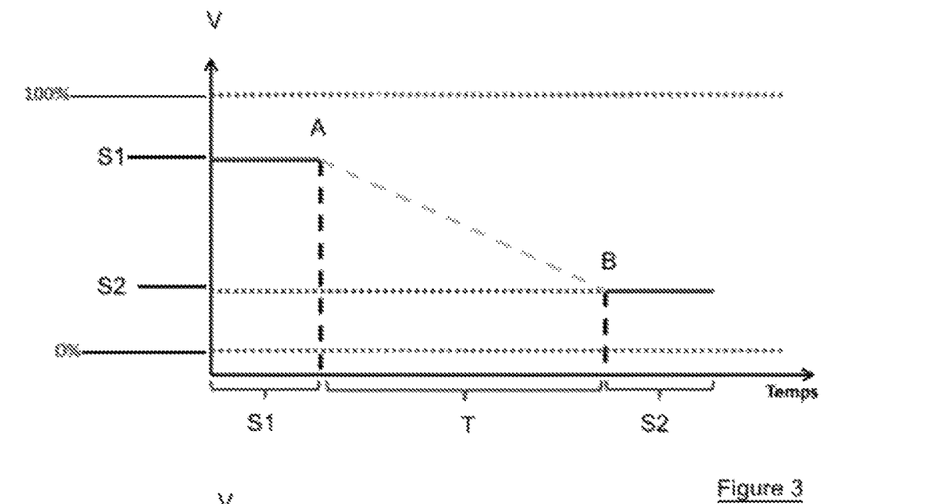
FIGS. 3 to 9 show examples of management strategy for the valve.

FIG. 3 schematically illustrates the situation of transition between the points A, representative of the stabilized point before the transition phase, and B, representative of the stabilized point after the transition phase. The point A can correspond for example to the start of a charge-up, and the point B to the instant from which the desired torque is reached. That can also illustrate a reduction of charge between A and B. The transition phase will, for its part, be represented in the following figures which describe examples of several strategies for optimally managing the transition between the two stabilized states A and B.

In FIG. 3, "100%" and "0%" respectively mark the opening and the total closure of the passage of the gases in the valve 74. Thus, the method for managing the transitional phases applies determined strategies comprising at least one sequence of opening (and/or of closure) of the proportional valve to obtain an optimized operation of the compressor 44 moved by the turbine 40 to switch from one stabilized state to another.

FIGS. 4 to 9 illustrate different examples of management of the scavenging level during the transitional phase. "Scavenging level" here designates the quantities of gas introduced by the partial transfer duct 64 for compressed air into the inlet of the turbine.

Figure 4:
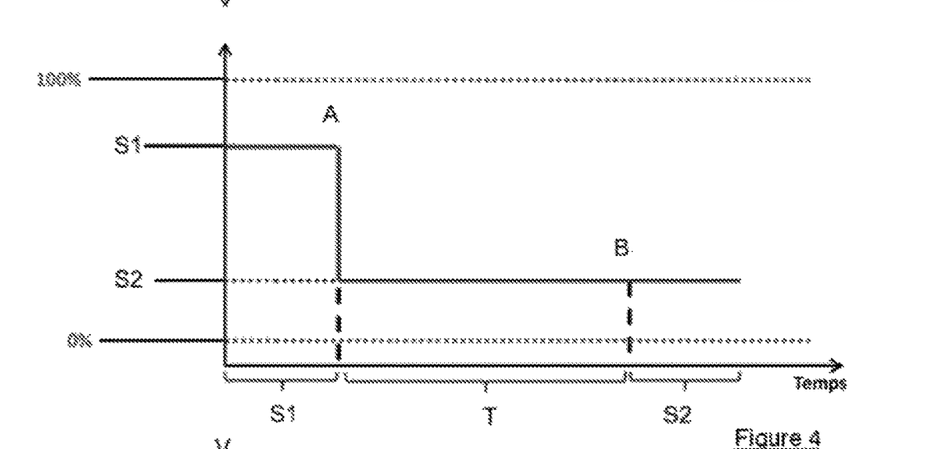

FIG. 4 corresponds to the case of a "scavenging" cut suddenly upon starting of the transitional phase at A to position it on the setting corresponding to the stabilized operating point B. It is noted that the fact that the "scavenging" is cut suddenly does not mean that the engine reaches its second stabilized operating point B immediately.

Figure 5:
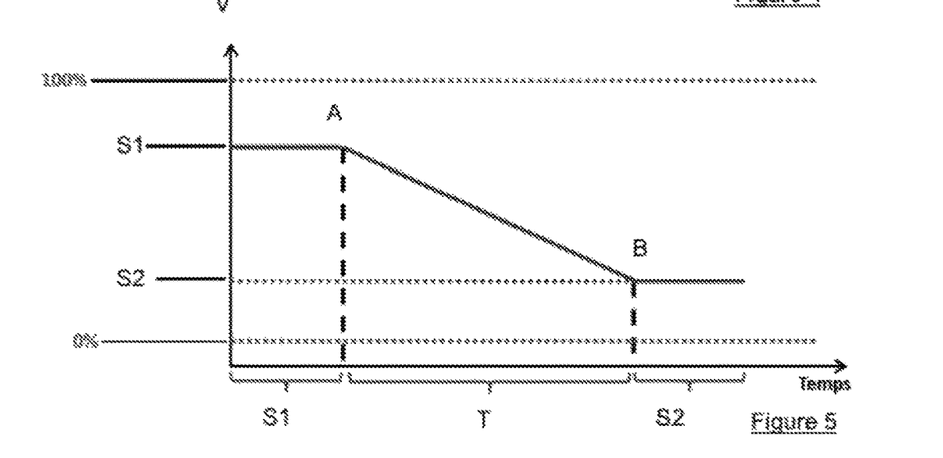

FIG. 5 corresponds to the case of a "scavenging" cut gradually, substantially linearly or not, during the transitional phase.

Figure 6:
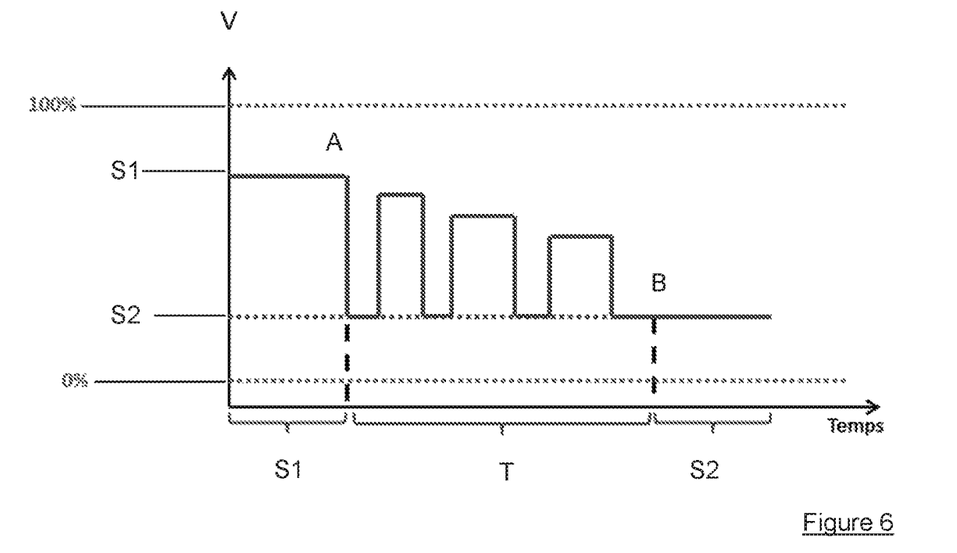

FIG. 6 corresponds to the case of a chopped "scavenging" strategy during the transitional phase. Here, several sequences of opening and of closure of the proportional valve are performed between the positions of the valve during the stabilized phases A and B.

Figure 7:
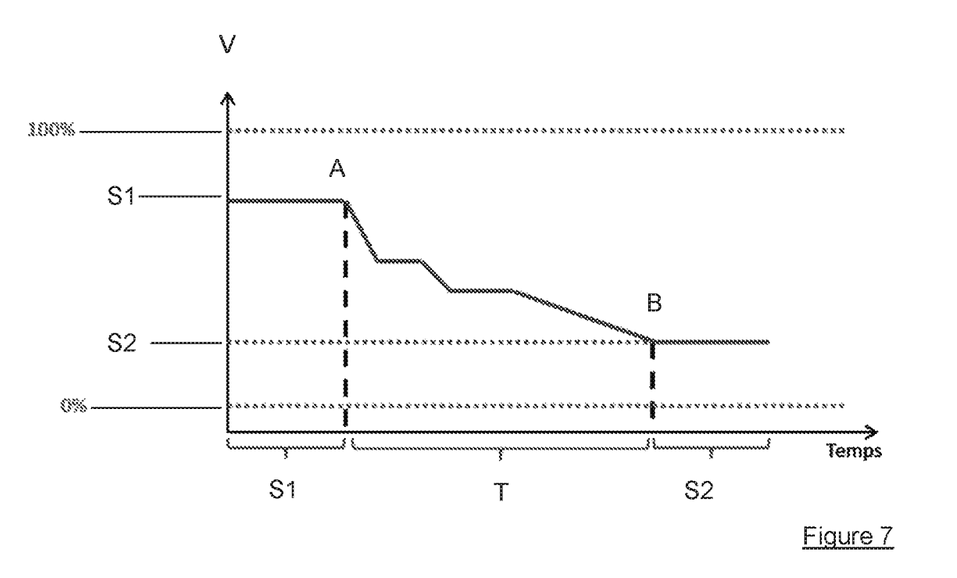

FIG. 7 corresponds to the case of a "scavenging" cut gradually with levels maintained during the transitional phase.

The choice of the method for optimal management of the proportional valve 74 during the transitional phase depends essentially on the characteristics of the starting stabilized operating point (point A) and on those of the target stabilized operating point (point B). In other words, the strategy for controlling the proportional valve must be optimized to best correspond to the characteristics of the operating points of the engine (charge, speed, flow rate, richness, time spent on each operating point, etc.) and of the supercharging (spin speed, pumping guard, etc.).

It is for example possible to describe a charge-up, that is to say a rapid increase in the demand for power to the engine. For this example, a case of transitional operation is considered with three main phases:

phase 1: engine stabilized on a low-charge operating point;

phase 2: charge-up transitional phase;

phase 3: engine stabilized on a high-charge operating point (charge greater than that of the first, "low" charge phase).

It is considered that the "scavenging" is active both on the first, low-charge operating point (first phase), and on the second, high-charge operating point with a level which can be different from that of the first phase according to the needs of the engine specific to this charge level. It is also envisaged to authorize the scavenging during the transitional phase, at variable levels, according to the examples illustrated previously.

Figure 8:
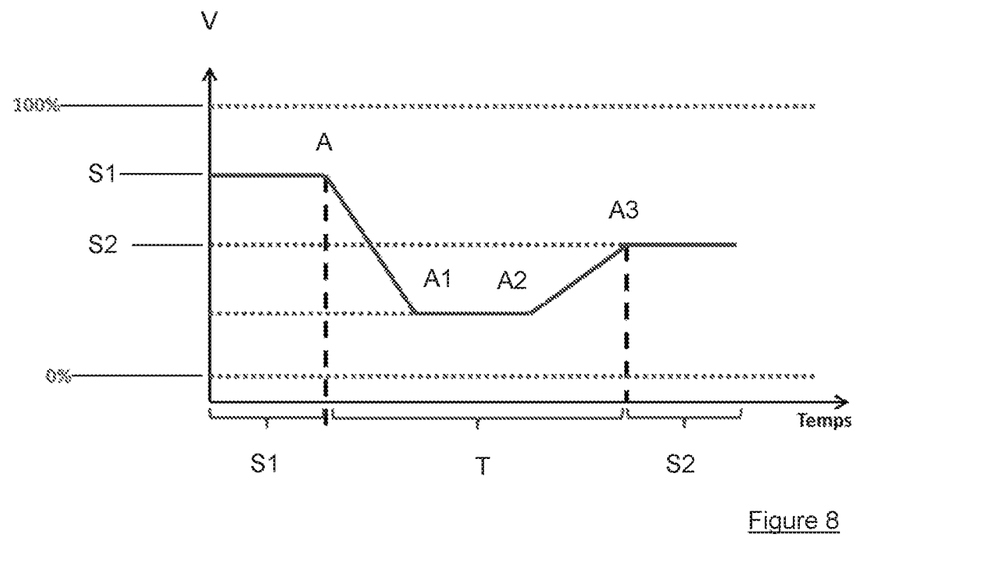

FIG. 8 schematically illustrates the case of charge-up with a simplified management of the scavenging. Initially, the scavenging is first gradually cut at the start of the transitional phase (trajectory A-A1), then a level is maintained with a certain level of "scavenging" during the transitional phase (trajectory A1-A2), and the "scavenging" is gradually increased at the end of the transitional phase (trajectory A2-A3).

Figure 9:
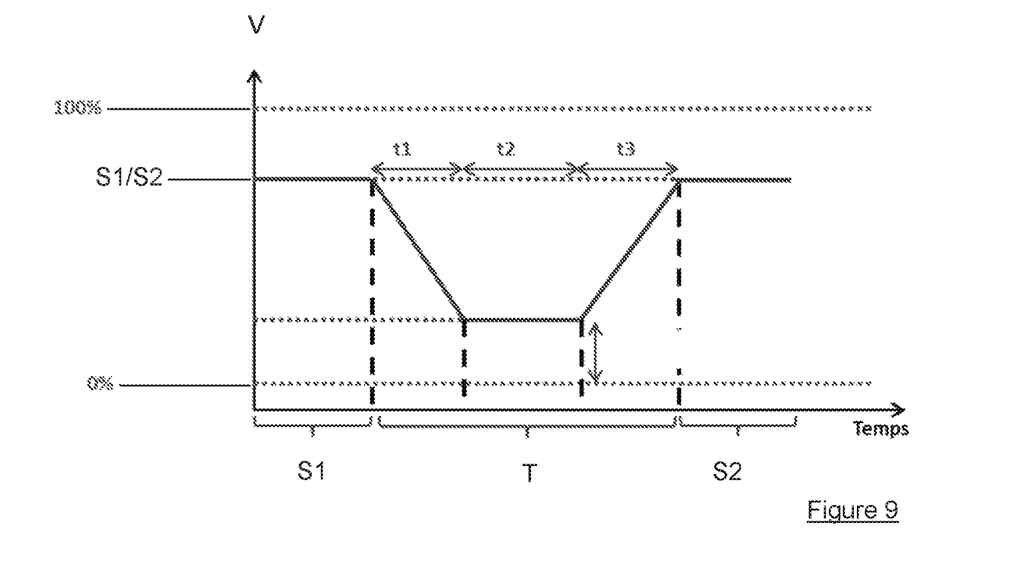

FIG. 9 illustrates the example in which the two stabilized phases are operated with one and the same "scavenging" level, that is to say with the same settings of the proportional valve. It is considered that only the level of closure during the transitional phase can be modified. This strategy relies on 4 parameters: the scavenging cutoff delay (t1), the cutoff time (i.e. the time spent with scavenging reduced or prevented, t2), the delay in restarting the scavenging (t3) and the "level" of cutoff.

The embodiments show that there is a trade-off to be found between:

a rapid restarting of the "scavenging" which can lead to a "hole" in the torque (linked to the intake/exhaust pressure balances, to the rate of residual gases, etc.);

a prolonged stoppage of the "scavenging" system which can lead to a reduction of the rotational speed of the turbine, a reduction which can then affect all the dynamics when the "scavenging" is once again authorized.

An optimal strategy hitherto identified has:

in cutting the scavenging very rapidly at the start of the transitional phase in order to obtain a rapid rise in the charge. Indeed, since the "low-charge" operating point allows the scavenging, the engine has a good richness margin for enriching the mixture rapidly and charging up (without however emitting fumes);

in then partially cutting the scavenging for a short time (approximately 0.2 to 0.3 seconds on the simulated cases) so as not to collapse the rotational speed of the turbine (a partial cutoff makes it possible a priori to retain a flow rate and maintain the turbine speed during the transitional phase);

and finally in restarting the scavenging "gently" so as to not cause the torque "hole" to appear.

Figure 10:
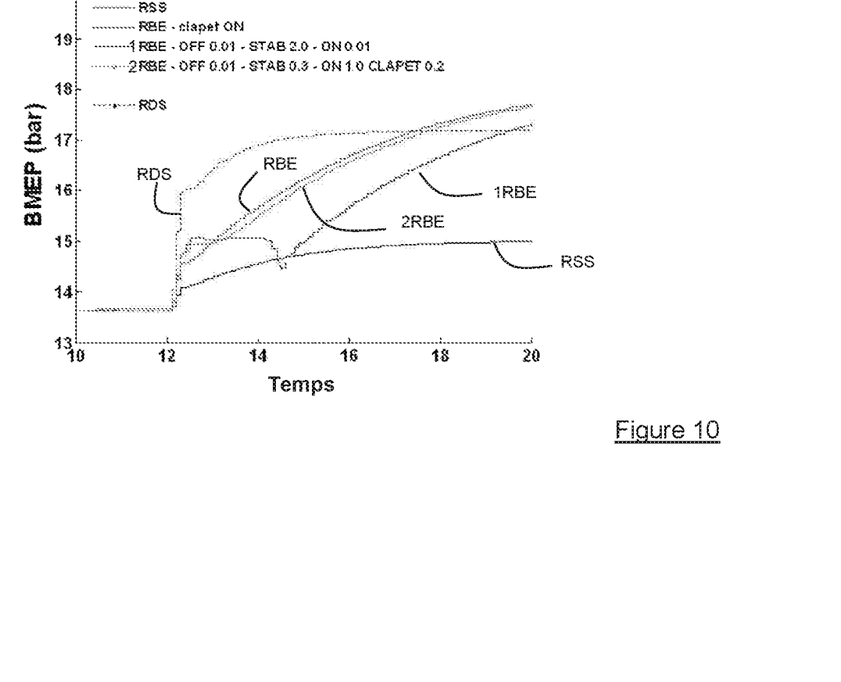
FIGS. 10 and 11 show examples of operation of a GMP (power train) according to the application of the present invention.

This optimal strategy and other simulated cases are illustrated in FIG. 10. The "RSS" curve corresponds to the reference operation "single supercharging reference". The "RDS" curve corresponds to a "double supercharging reference" case, an asymptotic case mentioned in this figure only for indication purposes, the scavenging system a priori allowing an engine with single supercharging to gain in performance levels but without reaching those of an engine with double supercharging.

The other curves correspond to an engine provided with single supercharging equipped with a partial transfer system for compressed air or so-called "scavenging" system, according to the invention. The "RBE" curve (external scavenging reference) corresponds to the case allowing the scavenging continuously, that is to say, on the low-charge point, during the transitional phase, and on the high-charge point.

The curve "1RBE-OFF 0.01-STAB 2.0-ON 0.01" corresponds to a case where the scavenging cutoff delay is 0.01 second, the scavenging prevention time is 2.0 seconds, and the scavenging restart time is 0.01 second. It can be seen in this case that a torque "hole" appears upon the restarting of the scavenging because the scavenging was stopped for too long.

The curve "2RBE-OFF 0.01-STAB 0.3-ON 0.2" finally corresponds to an optimal case where the scavenging cutoff delay is 0.01 second, the scavenging prevention time is 0.2 second, and the scavenging restart time is 0.2 second. As can be seen in this figure, this scavenging control strategy makes it possible to obtain a rapid charge-up.

Figure 11:
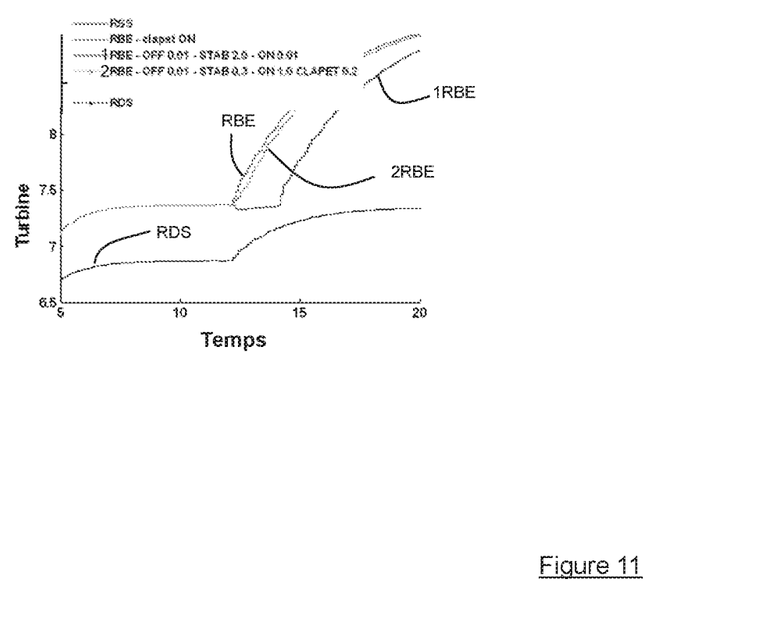

FIG. 11 illustrates the trend of the speed of the turbine 40. The slight drop in speed can in particular be seen, corresponding to the case which prevents the scavenging for too long.

As indicated previously, the optimal control strategy varies from one engine to another, the values of the different control parameters indicated here are therefore supplied purely as an indication.

The invention claimed is:

1. A method for controlling a quantity of air introduced into an intake of a supercharged internal combustion engine which includes a proportional valve located in a partial transfer duct which controls flow of compressed air flow through the partial transfer duct into an inlet of a turbine by controlling the proportional valve to move between open and closed positions in accordance with strategies which control a degree of opening of the proportional valve in accordance with stabilized phases of operation of the engine, the engine further including an exhaust gas outlet linked to an exhaust manifold, a supercharger including a turbocompressor including the turbine which has a single inlet connected to the exhaust gas outlet and to an outside air compressor and the partial transfer duct transferring compressed air flowing from the outside air compressor to the inlet of the turbine, the method comprising steps of:
- determining characteristics of stabilized phases of operation of the engine and controlling circulation of the compressed air during transitions between the stabilized phases of engine operation in accordance with the determined characteristics of the stabilized phases of the engine operation; and
- controlling operation of the proportional valve between a succession of stabilized phases of engine operation each spaced apart by transitional phases of operation of the engine beginning with an initial position of the proportional valve and controlling operation of the proportional valve in accordance with the determined characteristics until completion of the transitional phase which occurs upon reaching a next stabilized phase which are derived from previously completed mapping of speed and charging of the supercharged engine during a previous stabilized phase.

2. The method as claimed in claim 1, wherein the engine comprises a non-return valve disposed in the duct which prevents circulation of compressed air or exhaust gas back into the compressor.

3. The method as claimed in claim 1, comprising heating the compressed air circulating in the transfer duct.

4. The method as claimed in claim 2 comprising heating the compressed air circulating in the transfer duct.

5. The method as claimed in claim 3, comprising heating the compressed air circulating in the transfer duct by heat exchange with the exhaust gases.

6. The method as claimed in claim 4, comprising heating the compressed air circulating in the transfer duct by heat exchange with the exhaust gases.

7. The method as claimed in claim 1 comprising forming a control strategy by steps comprising:
- starting engine operation from an opening setting of the proportional valve which provides an initial stabilized state of the engine operation;
- reducing the opening setting of the proportional valve with a determined gradient which reduces the opening setting to a setting of the valve that is maintained for a time t; and
- after time t has elapsed, increasing the opening setting of the proportional valve until reaching a setting providing a stabilized phase of the engine.

8. The method as claimed in claim 2 comprising forming a control strategy by steps of:
- starting engine operation from an opening setting of the proportional valve which provides an initial stabilized state of the engine operation;
- reducing the opening setting of the proportional valve with a determined gradient which reduces the opening setting to a setting of the valve that is maintained for a time t; and
- after time t has elapsed, increasing the opening setting of the proportional valve until reaching a setting providing a stabilized phase of the engine.

9. The method as claimed in claim 3 comprising forming a control strategy by steps of:
- starting engine operating from an opening setting of the proportional valve which provides an initial stabilized state of the engine operation;
- reducing the opening setting of the proportional valve with a determined gradient which reduces the opening setting of the proportional valve to a setting of the valve that is maintained for a time t; and
- after time t has elapsed, increasing the opening setting of the proportional valve until reaching a setting providing a stabilized phase of the engine.

10. The method as claimed in claim 4 comprising forming a control strategy by steps of:
- starting engine operating from an opening setting of the proportional valve which provides an initial stabilized state of the engine operation;
- reducing the opening setting of the proportional valve with a determined gradient which reduces the opening setting of the proportional valve to a setting of the valve that is maintained for a time t; and
- after time t has elapsed, increasing the opening setting of the proportional valve until reaching a setting providing a stabilized phase of the engine.

11. The method as claimed in claim 5 comprising forming a control strategy by steps of:
- starting engine operating from an opening setting of the proportional valve which provides an initial stabilized state of the engine operation;
- reducing the opening setting of the proportional valve with a determined gradient which reduces the opening setting of the proportional valve to a setting of the valve that is maintained for a time t; and
- after time t has elapsed, increasing the opening setting of the proportional valve until reaching a setting providing a stabilized phase of the engine.

12. The method as claimed in claim 6 comprising forming a control strategy by steps of:
- starting engine operating from an opening setting of the proportional valve which provides an initial stabilized state of the engine operation;
- reducing the opening setting of the proportional valve with a determined gradient which reduces the opening setting of the proportional valve to a setting of the valve that is maintained for a time t; and
- after time t has elapsed, increasing the opening setting of the proportional valve until reaching a setting providing a stabilized phase of the engine.

13. The method as claimed in claim 6, wherein an initial stabilized state is a low charge state and a final stabilized state is a high charge state.

14. The method as claimed in claim 7, wherein an initial stabilized state is a low charge state and a final stabilized state is a high charge state.

15. The method as claimed in claim 8, wherein an initial stabilized state is a low charge state and a final stabilized state is a high charge state.

16. The method as claimed in claim 9, wherein an initial stabilized state is a low charge state and a final stabilized state is a high charge state.

17. The method as claimed in claim 10, wherein an initial stabilized state is a low charge state and a final stabilized state is a high charge state.

18. The method as claimed in claim 11, wherein an initial stabilized state is a low charge state and a final stabilized state is a high charge state.

19. The method as claimed in claim 12, wherein an initial stabilized state is a low charge state and a final stabilized state is a high charge state.

* * * * *